Aug. 25, 1925.
M. A. NETTER
1,551,423
CLUTCH
Filed Oct. 7, 1921
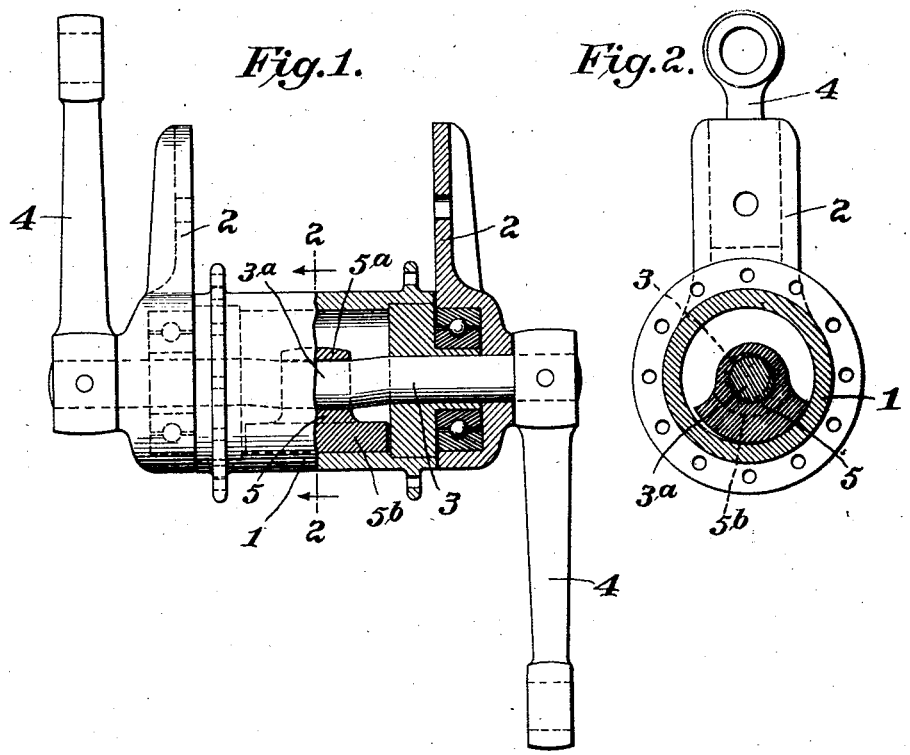
Inventor:
Milton A. Netter,
by Spier Middleton Donaldson Hall
Attys.

Patented Aug. 25, 1925.

1,551,423

UNITED STATES PATENT OFFICE.

MILTON A. NETTER, OF TOLEDO, OHIO.

CLUTCH.

Application filed October 7, 1921. Serial No. 506,134.

*To all whom it may concern:*

Be it known that I, MILTON A. NETTER, a citizen of the United States, and resident of Toledo, in the county of Lucas and State of Ohio, have invented certain new and useful Improvements in Clutches, of which the following is a specification.

My said invention relates to improvements in clutches designed to connect together two rotatable elements to transmit driving motion from one to the other, and the invention aims to provide an extremely simple, durable, economical and efficient double acting construction as will hereinafter more fully appear.

The invention includes the novel features of construction and arrangement and combination of parts hereinafter described and particularly defined by the appended claim.

My invention is illustrated in the accompanying drawings in which

Figure 1 is an elevation, partly in section showing a bicycle clutch constructed in accordance with my invention.

Fig. 2 is a section on line 2—2 of Fig. 1.

Referring by reference characters to these drawings the numeral 1 designates a bicycle hub journaled in suitable bearings in the frame members 2.

Journaled within the hub is a drive shaft 3 which may be provided with any suitable power applying means, such as cranks 4 and this shaft has a slightly cranked or eccentric portion 3ª from which is pendantly supported a clutch member 5. This clutch member has an upper portion provided with an eye or opening which is rotatably engaged by the cranked or eccentric portion of the shaft, and an enlarged lower portion 5ᵇ which is preferably widened and elongated and has a curved exterior corresponding approximately to the interior curvature of the hub.

The enlarged and correspondingly heavier portion of the clutch will act as a weight and cause it to tend to assume a vertically pendant position, when the cranked portion 3ª is elevated and the shaft stationary in which position the lower curved face of the clutch member will be free from the inner face of the hub which can then rotate freely in either direction. When, however, power is applied to rotate the shaft 3 in either direction, the turning of the eccentric portion will force the clutch or shoe downwardly into frictional locking contact with the inner surface of the hub and the hub and shaft will be caused to rotate together.

The holding of the shaft stationary will effect a reverse action and release the clutch.

Having thus described my invention what I claim is:

In combination, bicycle frame members, a hollow hub having spoke attaching flanges on its outer periphery and a reduced interior portion underlying the spoke attaching flanges, journal pieces occupying the reduced portions of said hollow hub having axial extensions and central apertures, bearings mounted upon and surrounding said axial extensions, said frame members covering said bearings and also provided with apertures, a drive shaft penetrating the frame members and the journal pieces and having a bent eccentric portion centrally located and a pendant clutch member engaging said eccentric portion of the drive shaft and adapted to engage the interior tubular face of the hub upon rotation of the drive shaft.

In testimony whereof I affix my signature.

MILTON A. NETTER.